United States Patent [19]

Matsuda

[11] Patent Number: 5,660,244

[45] Date of Patent: Aug. 26, 1997

[54] WORK VEHICLE

[75] Inventor: Kenji Matsuda, Sakai, Japan

[73] Assignee: Kubota Corporation, Japan

[21] Appl. No.: 546,377

[22] Filed: Oct. 20, 1995

[30] Foreign Application Priority Data

Oct. 24, 1994 [JP] Japan ................... 6-257886

[51] Int. Cl.⁶ ................................................ B60K 11/00
[52] U.S. Cl. ........................... 180/68.1; 180/69.21
[58] Field of Search .................... 180/68.1, 68.2, 180/68.4, 68.6, 69.2, 69.21, 69.24

[56] References Cited

U.S. PATENT DOCUMENTS

| | | | |
|---|---|---|---|
| 4,081,050 | 3/1978 | Hennessey et al. | 180/68.1 X |
| 4,940,100 | 7/1990 | Ueda | 180/68.1 |
| 5,113,819 | 5/1992 | Murakawa et al. | 180/68.1 X |
| 5,193,636 | 3/1993 | Holm | 180/68.1 |
| 5,207,187 | 5/1993 | Kurohara et al. | 180/68.1 X |

FOREIGN PATENT DOCUMENTS 429477  3/1992  Japan ................... B62D 25/08

*Primary Examiner*—Kevin Hurley
*Attorney, Agent, or Firm*—Webb Ziesenheim Bruening Logsdon Orkin & Hanson, P.C.

[57] ABSTRACT

A work vehicle is constructed such that engine-cooling fresh ambient air is introduced from a driver's deck and then the used air after cooling is discharged forwardly of the vehicle body. The work vehicle includes an engine hood vertically pivotable about a pivot axis provided at a front portion of a vehicle body, the hood including an air outlet opening for discharging the used air after cooling, a control panel forming a rear wall of an engine room, the control panel including an air intake opening for introducing the ambient air and an instrument panel. This instrument panel is formed integrally with an upper and rear end portion of the engine hood, so that the instrument panel may be pivotably opened upwards together with the control panel.

10 Claims, 4 Drawing Sheets

WORK VEHICLE

BACKGROUND OF THE INVENTION

1. Field of the Invention

The present invention relates to a work vehicle such as a passenger type lawn mower vehicle or a tractor, and more particularly to a work vehicle having an engine hood which may be pivotably opened and closed in the vertical direction about an axis at a front portion of the vehicle body, the vehicle being constructed such that engine-cooling fresh ambient air is introduced through an air inlet opening defined in a control panel forming a rear wall of an engine room and the used air after cooling is discharged through an air outlet opening defined in a front face of the engine hood.

2. Description of the Related Art

According to a conventional work vehicle of the above-noted type, as disclosed in e.g. Japanese utility model kokai No. Hei. 4-29477, an outer frame of a control panel forming a rear wall of an engine room is fixed to a vehicle chassis.

With the above work vehicle, engine-cooling ambient air is introduced from an area around the driver's deck which is relatively free from straw dust or the like, whereby premature clogging phenomenon of a dustproof mesh, which constitutes the air intake face of the control panel, may be advantageously avoided. However, when e.g. an operator is to clean the inner side of the dustproof mesh from the side the driver's seat, presence of an instrument panel hinders the operator's view, so that the operator would find it difficult to reach the inner side, particularly its upper portion, of the dustproof mesh. Further, with the above work vehicle, the control panel consists essentially of a detachable dustproof mesh portion and a fixed frame member which is fixed to the vehicle chassis. Thus, for effecting a cleaning operation of the inside of the engine room, the dustproof mesh may be detached; yet, the cleaning operation, particularly of the battery, radiator and their peripheral components, tends to be troublesome because of the presence of the fixed frame member and a steering column.

In view of the above-described state of the art, the primary object of the present invention is to solve the above drawbacks of the convention by providing a construction which allows a speedy and easier cleaning operation of the inner face of the dustproof mesh and also of the inside of the engine room.

SUMMARY OF THE INVENTION

For accomplishing the above-noted object, according to the present invention, in a work vehicle constructed such that engine-cooling fresh ambience air is introduced from a driver's deck and then the used air after cooling is discharged forwardly of the vehicle body, the work vehicle comprises:

- an engine hood vertically pivotable about a pivot axis provided at a front portion of a vehicle body, the hood including an air outlet opening for discharging the used air after cooling;
- a control panel forming a rear wall of an engine room, the control panel including an air intake opening for introducing the ambience air; and
- an instrument panel formed integrally with an upper and rear end portion of the engine hood.

With the above-described construction, when the engine hood is pivotably opened upwards, the instrument panel too is moved upwards together with the engine hood. Accordingly, the operator, from the position of the driver's seat, may readily reach the inside of the engine room, particularly the radiator, battery and their peripheral components and reach also the upper inner portion of the dustproof mesh.

According to a further aspect of the invention, in the work vehicle having the above construction, a steering column mounts an attaching bracket, and the control panel includes an outer frame which is detachably attached to a floor of the vehicle body through the attaching bracket and a fixing member, thereby to allow the control panel to be detached from the outside of the vehicle body.

With the above construction, after the engine hood is pivotably opened, the control panel with its dustproof mesh too may be detached by unfastening the fixing member of the outer frame. Thus, when the cleaning operation of the inside of the engine room is effected, the operation is hindered only by the steering column. Therefore, the access, from the driver's deck, to the inside of the engine room for the battery, radiator and other peripheral components may be further facilitated.

According to a still further aspect of the present invention, a wiring for the instrument panel is caused to extend from the instrument panel along inner sides of an upper face and a front face of the engine hood toward a vehicle chassis.

With the above construction, the opening/closing operation of the engine hood may remain free from interference by the presence of the wiring for the instrument panel, so that the engine hood may be opened and closed smoothly. Moreover, as the wiring is disposed away from the steering column, the cleaning operation of the battery, radiator and other peripheral components thereof may be further facilitated.

Further and other objects, features and effects of the invention will become more apparent from the following more detailed description of an embodiment of the invention with reference to the accompanying drawings.

DESCRIPTION OF THE PREFERRED EMBODIMENT

A preferred embodiment of a passenger type lawn mower vehicle relating to the present invention will be described in details with reference to the accompanying drawings.

Figure 1:
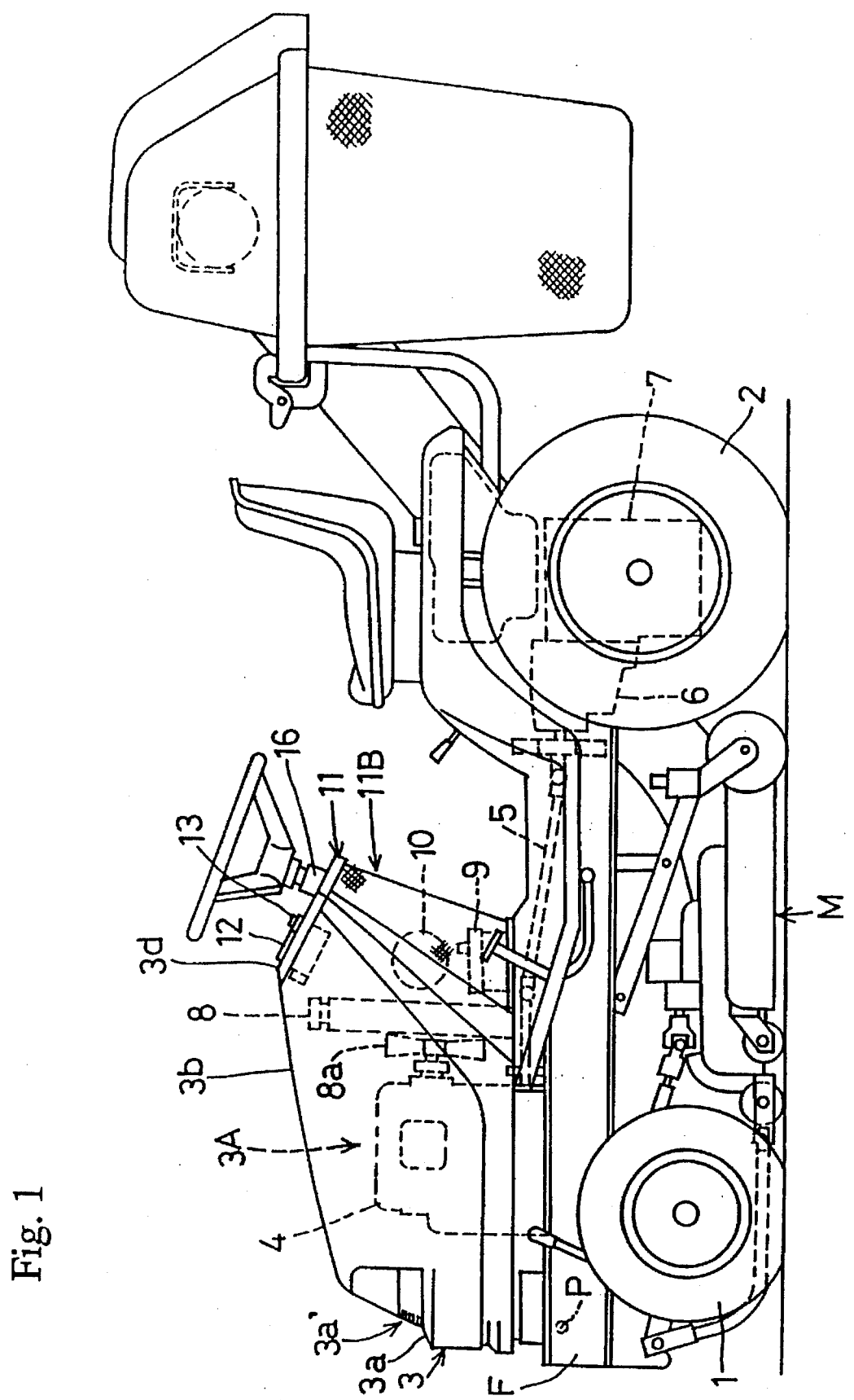
FIG. 1 is a general side view of a passenger type lawn lower vehicle.

FIG. 1 shows, in its entirety, a midship-mount type passenger lawn mower vehicle mounting a mower device M between front and rear wheels 1, 2. In this low mower vehicle, power from an engine 4 housed inside an engine hood 3 provided at a front portion of the vehicle body is transmitted via a transmission shaft 5 to a hydrostatic type stepless speed changer 6 disposed at a rear portion of the vehicle body, and then the power from this speed changer 6 is transmitted via a transmission housed in a transmission casing to eventually drive the rear wheels 2.

Inside an engine room 3A shrouded and defined by the engine hood 3, there are disposed such components as a radiator 8 for the engine 4, a radiator cooling fan 8a, a battery 9, and an air cleaner 10. Fresh ambience air for cooling the engine is introduced through an air intake opening 11B defined in a control panel 11 which constitutes a rear wall of the engine room 3A; and then the used air after the cooling is discharged through an air outlet opening 3a' defined in a front face of the engine hood 3.

The control panel 11 has a front-opened hook-like plan configuration consisting of an upper face portion, right and left side face portions and a rear face portion. The upper face portion is divided into two sections of a front section and a rear section. The front section provides an instrument panel 3d which is formed integral with a rear end of the engine hood 3, and the rear section provides an upper cover case portion 11a which is formed integral with the right and left side face portions and the rear face portion. The upper cover case portion 11a, the right and left side face portions and the rear face portion together constitute an outer frame 11A to which a dustproof mesh 11C is attached. The control panel 11 has a lower end thereof detachably attached to a floor of a driver's deck by means of bolts 31 and its upper portion thereof fixedly supported, by means of bolts 32, to an attaching bracket 17 mounted on a steering column 18. Accordingly, by fastening or unfastening these bolts 31, 32, the control panel 11 is attachable to and detachable from the vehicle body.

The engine hood 3 has a bottom-opened hook-like configuration consisting of a front face portion 3a, an upper face portion 3b and right and left side face portions 3c. This entire engine hood 3 is pivotable such that a rear-wise portion thereof pivots about a pivot axis P formed at a front lower end portion of the hood. Further, as described supra, the instrument panel 3d extending to the front section of the upper face portion of the control panel 11 is formed integral and co-extensive with the rear end of the upper face portion 3b of the engine hood 3.

The instrument panel 3d includes a gauge display section 12 including various gauges or meters such as a speedometer and a fuel gauge, a control switch section 13 including various operating switches such as a mower lift switch, and a wiring 14 for the mentioned gauges and switches. And, the wiring 14 is caused to extend along the inner face of the engine hood 3 so as not to interfere with the opening/closing movement of this engine hood 3.

More particularly, the wiring 4 includes a first wire extension 14a extending along the inner side of the upper face 3b of the hood 3 and a second wire extension 14b extending along the inner side of the front face 3a of the engine hood 3. The first wire extension 14a is fixed, by connecting members, 41, 42, 43, on to the inner surface of the upper face 3b with a predetermined distance from the upper portion 4a of the engine hood 4 in order not to interfere with the engine 4 or a cooling fan 8a for the radiator 8. The second wire extension 14b extends from the first wire extension 14a along the inner side of the front face 3a of the engine hood 3 and further through the vicinity of the pivot axis P toward the vehicle chassis F. Also, as may be apparent from FIGS. 2 and 3, the second wire extension 14b is provided with an appropriately sufficient length with retaining some excess length under the opened condition of the engine hood 3 illustrated in FIG. 3, so as to protect the wiring from excessive tension or looseness applied in association with the pivotal opening or closing operation of the engine hood 3. Further, if the first wire extension 14a is caused to extend, along the upper face 3b, in the vicinity of one of the right and left side faces 3c of the hood 3, adverse influence of the heat generated from the engine 4 on this first wire extension 14a may be minimized.

For fixing the engine hood 3 in its closed position, a rear end portion thereof is retained by a pair of right and left retainer elements 15b, 15b (corresponding to 'engaged portions') comprised of plate springs and provided at the forward end of the upper cover case portion 11a of the control panel 11 via a pair of right and left U-shaped metal elements 15a, 15a (corresponding to 'engaging portions'). The upper cover case portion 11a is secured to the attaching bracket 17 by means of bolts 32 acting as the fixing member mentioned supra.

Figure 2:
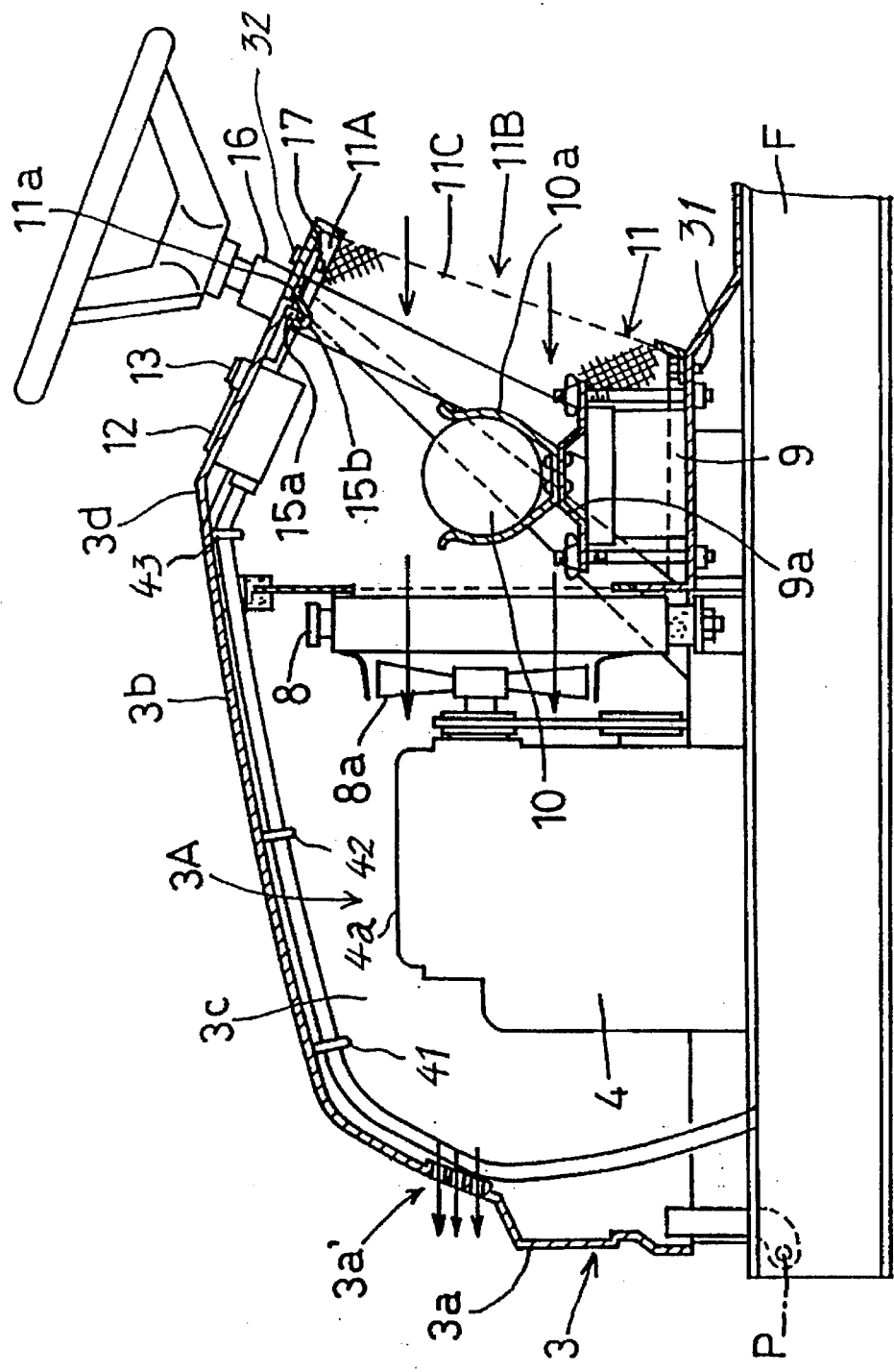
FIG. 2 is a side view in vertical section showing an inside of an engine hood.
Figure 3:
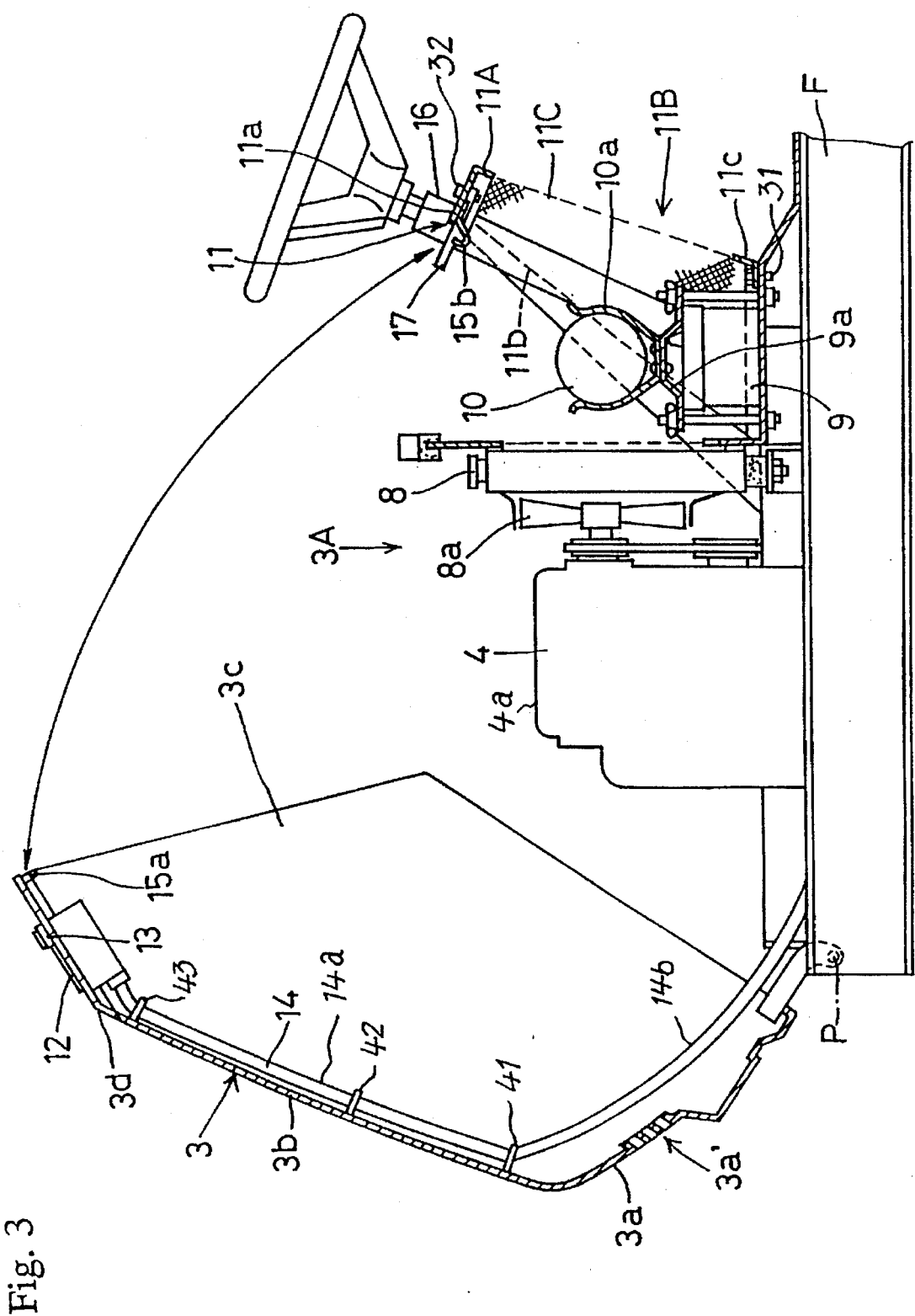
FIG. 3 is a side view in vertical section illustrating opened and closed conditions of the engine hood.
Figure 4:
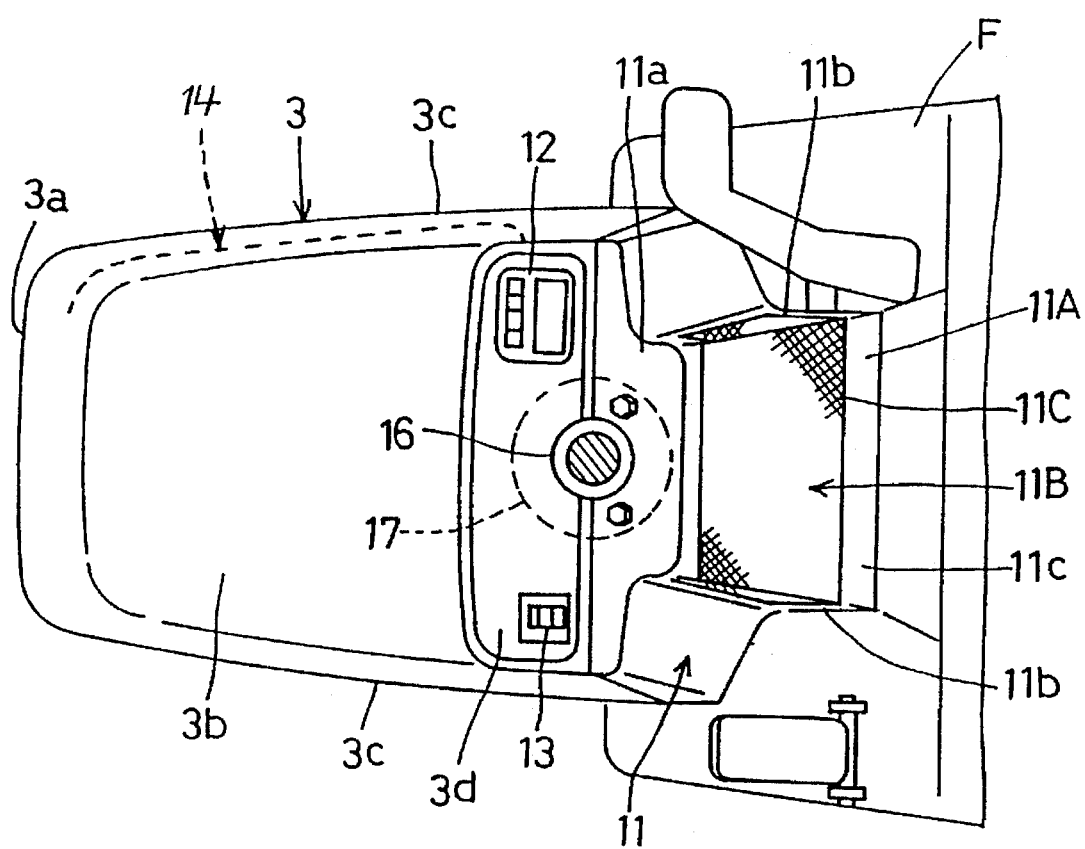
FIG. 4 is a plan view of a control panel.

As shown in FIG. 2, a clamping member 9a for the battery 9 mounts thereon a retainer member 10a for the air cleaner 10, such that the retainer member 10a of the air cleaner 10 may be mounted on the vehicle body in association with attachment of the battery clamping member 9a.

In this invention, the work vehicle is not limited to the passenger type lawn mower vehicle disclosed in the foregoing embodiment. The work vehicle may comprise a tractor or the like.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A work vehicle constructed such that engine-cooling fresh ambient air is introduced from a driver's deck and then the used air after cooling is discharged forwardly of the vehicle body, the work vehicle comprising:

an engine hood vertically pivotable about a pivot axis provided at a front portion of a vehicle body, the hood including an air outlet opening for discharging the used air after cooling;

a control panel forming a rear wall of an engine room, the control panel including an air intake opening for introducing the ambient air; and an instrument panel formed integrally with an upper and rear end portion of the engine hood.

2. A work vehicle as defined in claim 1, wherein an upper portion of the control panel and the engine hood are supported to a steering column through connecting means.

3. A work vehicle as defined in claim 2, wherein said connecting means includes an engaging portion of the instrument panel and an engaged portion of an upper cover case portion of the control panel.

4. A work vehicle as defined in claim 3, wherein the steering column mounts an attaching bracket, and the control panel includes an outer frame which is detachably attached to a floor of the vehicle body through the attaching bracket and a fixing member, thereby to allow the control panel to be detached from the outside of the vehicle body.

5. A work vehicle as defined in claim 1, wherein a wiring for the instrument panel is caused to extend from the instrument panel along inner sides of an upper face and a front face of the engine hood toward a vehicle chassis.

6. A work vehicle as defined in claim 5, wherein said wiring includes a first wire extension extending along an inner side of the upper face of the engine hood and a second wire extension extending along an inner side of a front face of the engine hood, said first wire extension is being disposed with a predetermined distance from the inner side of the upper face of the engine hood.

7. A work vehicle as defined in claim 6, wherein said second wire extension extends through the vicinity of said pivot axis.

8. A work vehicle as defined in claim 1, wherein said instrument panel has a gauge display section including a speedometer and a control switch section including a control switch of a work device mounted on the vehicle.

9. A work vehicle constructed such that engine-cooling fresh ambient air is introduced from a driver's deck and then the used air after cooling is discharged forwardly of the vehicle body, the work vehicle comprising:

an engine hood vertically pivotable about a pivot axis provided at a front portion of a vehicle body, the hood including an air outlet opening for discharging the used air after cooling;

a control panel forming a rear wall of an engine room, the control panel including an air intake opening for introducing the ambient air; and an instrument panel formed integrally with an upper and rear end portion of the engine hood;

wherein, a wiring for the instrument panel is caused to extend from the instrument panel along inner sides of an upper face and a front face of the engine hood toward a vehicle chassis.

10. A work vehicle as defined in claim 9, wherein said instrument panel has a gauge display section including a speedometer and a control switch section including a control switch of a work device mounted on the vehicle.

* * * * *